United States Patent
Ouwerkerk et al.

(10) Patent No.: US 6,608,713 B2
(45) Date of Patent: Aug. 19, 2003

(54) OPTICAL SWITCHING DEVICE

(75) Inventors: Martin Ouwerkerk, Eindhoven (NL); Anna-Maria Janner, Eindhoven (NL); Paul Van Der Sluis, Eindhoven (NL); Virginie Marie Marguerite Mercier, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/994,360

(22) Filed: Nov. 26, 2001

(65) Prior Publication Data

US 2002/0089732 A1 Jul. 11, 2002

(30) Foreign Application Priority Data

Nov. 27, 2000 (EP) ............................................. 00204212
Dec. 22, 2000 (EP) ............................................. 00204782

(51) Int. Cl.$^7$ .......................... G02F 1/153; H01L 29/02
(52) U.S. Cl. ................. 359/275; 257/2; 257/4; 257/107; 257/108

(58) Field of Search ................................ 359/275, 320, 359/263, 267, 254, 270; 257/2, 4, 107, 108

(56) References Cited

U.S. PATENT DOCUMENTS

| | | | | | |
|---|---|---|---|---|---|
| 5,635,729 | A | * | 6/1997 | Griessen et al. | 257/2 |
| 5,905,590 | A | * | 5/1999 | Van Der Sluis et al. | 359/275 |
| 5,970,187 | A | * | 10/1999 | Notten et al. | 385/16 |
| 6,310,725 | B1 | * | 10/2001 | Duine et al. | 359/585 |

* cited by examiner

*Primary Examiner*—Hung Xuan Dang
*Assistant Examiner*—Tuyen Tra

(57) ABSTRACT

A description is given of a switching device (1) comprising a transparent substrate (3), a switching film (5) comprising a hydride of scandium and magnesium, covered with a palladium layer (7). By exchange of hydrogen, the switching film can be reversibly switched from a transparent state to a mirror-like state with zero transmission via an intermediate black absorbing state. The conversion between both states is reversible, and this phenomenon can be used, for example, in an optical switching element or sun roof.

18 Claims, 1 Drawing Sheet

OPTICAL SWITCHING DEVICE

Figure 1:
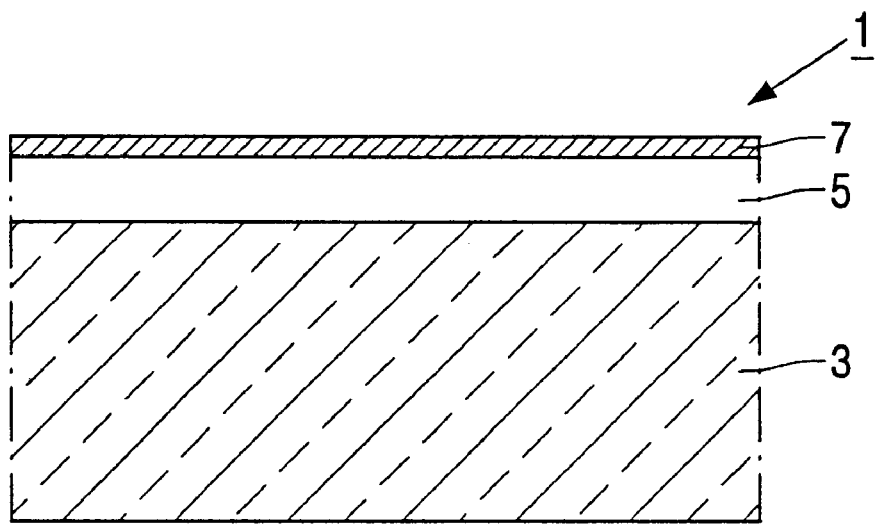

The invention relates to an optical switching device comprising a substrate and a switching film which comprises a hydride of a trivalent metal and magnesium, which hydride can be reversibly switched from a low-hydrogen, mirror-like composition to a high-hydrogen, transparent composition by an exchange of hydrogen. The invention further relates to a switching film, applicable in an optical switching device. The invention also relates to an electrochemical switching device comprising such a switching film. The invention additionally relates to applications of such a switching device.

In the relevant switching devices, the optical properties are governed by external influences, such as gas pressure, an electric potential or current.

A switching device according to the preamble is known from the European patent application EP-A-0 871 926 filed by the applicant. The switching film which is disclosed in said application comprises hydrides of a trivalent metal, such as gadolinium, lutetium, yttrium and lanthanum, and magnesium, preferably covered with a palladium layer. Said switching films provide excellent results in terms of the large contrasts between their low-hydrogen and high-hydrogen state. To this end reference is made to "Contrast enhancement of rare-earth switchable mirrors through microscopic shutter effect", by Nagengast et al., Applied physics letters, volume 75, nr. 14. However, the phase separation into magnesium and rare-earth hydride as discussed in the latter publication, after repetitive cycling also results in a relatively short life-time of the switchable mirror.

It is an object of the present invention to provide an optical switching device with an improved life-time.

In accordance with the invention, this object is achieved by an optical switching device according to the preamble, which switching device is characterized in that the trivalent metal comprises scandium.

It has been found that alloys of scandium and magnesium are very good hydrogen storage materials. As the scandium and magnesium atoms are of about the same size, a so called solid solution is formed. Phase separation into magnesium and scandium hydride induced by repetitive cycling of the materials between mirror-like and transparent or black states does substantially not occur, or at least to a far lesser extent than with magnesium-rare earth alloys. Accordingly, life-time problems due to the formation of large magnesium particles in the switching layer can be avoided or at least substantially delayed.

The scandium magnesium switching film according to the present invention has a very high transmission in the transparent state and a very low transmission in the non-transparent state to almost zero. This means a high contrast, which is the ratio between both transmission values. The scandium magnesium switching film can provide for three stable states which are governed by the hydrogen content of the switching film, namely, as the hydrogen content increases: a mirror-like state, a black absorbing state, and a transparent state.

Advantageously, the switching film comprises 1–50 at. % scandium and 50–99 at. % magnesium, more advantageously 15–40 at. % scandium and 60–85 at. % magnesium and preferably 35 at. % scandium and 65 at. % magnesium.

The specific amounts of the different components in the alloy are determined by weighting the kinetics and the hydrogen uptake against each other.

Instead of an alloy of scandium and magnesium, a stack of alternating thin layers of scandium and Mg may be used, e.g. a multilayer stack of 50 Mg|Sc pairs. Such a multilayer has the additional advantage of increasing the switching speed between the optical states.

In a particular embodiment, the scandium-magnesium switching film additionally comprises another trivalent metal.

The switching film may, for example, comprise a hydride of more than one trivalent metal and magnesium, such as scandium-gadolinium-magnesium hydride, $ScGdMgH_x$. Of course, combinations of scandium with another trivalent metal may also be used.

In an advantageous embodiment the scandium-magnesium switching film additionally comprises an element selected from the group of nickel, aluminum, chromium, silicon, iron, cobalt, silver, zirconium, niobium, tantalum and hafnium.

The addition of 1% Ni in $Sc_{30}Mg_{70}$ prolongs the life by a factor 4, while the addition of 2% Ni results in a life prolonging by a factor 11.

Switching of the switching film takes place with hydrogen. The transmission of the switching film is governed by the hydrogen content: the transmission increases as the hydrogen content increases. If molecular hydrogen gas is supplied to the switching film, the transmission increases as the hydrogen pressure increases. The hydrogen must be dissociated to atomic H. The rate of dissociation can be increased by providing the surface of the switching film with a catalytically active layer, such as a thin layer of palladium having a thickness, for example, of 5 nm. At said thickness, the palladium layer is discontinuous. The layer thickness is not critical and is chosen to be in the range between 2 and 25 nm. Thin layers of 2 to 10 nm are preferred, however, because the thickness of the palladium layer determines the maximum transmission of the switching device. In addition, the palladium layer protects the underlying switching film against oxidation.

Apart from palladium, other catalytically active metals which promote hydrogen dissociation, such as platinum, nickel and cobalt, or alloys with these metals, can be provided on the switching film.

In an advantageous embodiment the catalytically active layer comprises a layer of Ag(x)Pd(1−x), where x is about 0.25.

Such catalyst layer shows a significant improved behaviour in terms of cycling durability.

In order to improve the cycling durability in an alternative manner a protective layer is placed between the catalytically active layer and the switching film.

Said protective layer preferably comprises a NiZr or a ZrOH compound and has a thickness of 10 to 100 mn.

The molecular hydrogen can be passed from a gas cylinder filled with $H_2$ to the switching film at room temperature in a simple manner. A low-hydrogen-content mirror-like switching film then changes to a transparent hydrogen-rich state. This conversion is reversible: the transparent film is converted to a mirror-like state by heating and/or evacuation of hydrogen. Said reversible conversion can take place around room temperature, or higher temperatures.

Atomic hydrogen can also be obtained in other ways, such as by electrolytic reduction of water at the switching film in accordance with the following reaction:

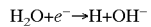

Atomic hydrogen can additionally be generated from a hydrogen plasma. In this case, a catalytically active layer, for example, of palladium is not necessary. Atomic hydrogen can also originate from another metal hydride, such as metal alloys for hydrogen storage, which are known per se.

The switching film in accordance with the invention is thin, i.e. its film thickness is less than 2 $\mu$m. The film thickness of the switching film preferably ranges between 100 and 1,000 nm. As hydrogen must diffuse in the switching film, the film thickness determines the rate of fall conversion from the mirror-like to the transparent state, and conversely.

The object of the invention, i.e. to provide an optical device which can be switched electrochemically, is achieved by a device comprising a first and a second electrode separated by an ion-conducting electrolyte, the first electrode comprising a switching film of hydrides of scandium and magnesium, which switching film is provided with an electrocatalytic metal layer in contact with the electrolyte, so that by applying a potential or current between the electrodes a change in optical transmission of the switching layer is detectable when the hydride is electrochemically converted from a low-hydrogen-content mirror-like state to a hydrogen-rich transparent state by an exchange of hydrogen, and vice versa.

The optical switching device according to this embodiment of the invention is an electrochemical cell, in which one of the electrodes comprises a switching film of hydrides of scandium and magnesium, which film is in contact with a ion-conducting electrolyte via a thin catalytic metal layer. The switching film is loaded with hydrogen by electrolytic reduction of protons, or a hydrogen-containing species, such as water, or by oxidation of $H^-$-ions, by applying a potential between the electrodes. At this electrode/electrolyte interface e.g. water is reduced to atomic hydrogen. The generated atomic hydrogen (H) will cause a conversion from the mirror-like state to the transparent state. Changing the potential leads to oxidation of the transparent state into the mirror-like state. In this way a reversible electro-optical switch is obtained.

In order to increase the rate of hydriding and dehydriding, and thus the switching speed, the metal-hydride-containing switching film is provided with a thin layer of an electrocatalytic metal or alloy, such as palladium, platinum or nickel. These metals catalyze inter alia the reduction of protons to hydrogen. Other suitable catalytic metals are the alloys of the so called $AB_2$ and $AB_5$ types, such as $TiNi_2$ and $LaNi_5$. In addition, this metal layer protects the underlying switching film against corrosion by the electrolyte. As explained herein above, this layer has a thickness in the range between 2 and 25 nm. Thin layers of 2 to 10 nm are preferred, however, because the thickness of the film determines the maximum transmission of the switching device.

The electrolyte must be a good ion conductor, but it must be an isolator for electrons in order to prevent self-discharge of the device. As an electrolyte liquid, use can be made of electrolytes, such as an aqueous solution of KOH. Such a solution is a good ion conductor, and the metal hydrides are stable in it. The electrolyte may also be present in the gel or solid state.

Use is most preferably made of transparent solid-state electrolytes, because of the simplicity of the device; they prevent sealing problems, and the device is easier to handle. Both solid inorganic and organic compounds can be used. Examples of inorganic electrolytes, which are good proton ($H^+$) conductors, are hydrated oxides such as $Ta_2O_5.nH_2O$, $Nb_2O_5.nH_2O$, $CeO_2.nH_2O$, $Sb_2O_5.nH_2O$, $Zr(HPO_4)_2.nH_2O$, $ZrO_{(2+x)}H_y$ and $V_2O_5.nH_2O$, $H_3PO_4(WO_3)_{12}.29H_2O$, $H_3PO_4(MoO_3)_{12}.29H_2O$, $[Mg_2Gd(OH)_6]OH.2H_2O$ and anhydrous compounds such as $KH_2PO_4$, $KH_2AsO_4$, $CeHSO_4$, $CeHSeO_4$, $Mg(OH)_2$ and compounds of the type $MCeO_3$ (M=Mg, BA, Ca, Sr), in which a part of CE has been substituted by Yb, Gd or Nb. Also glasses may be used, such as alkali-free zirconium phosphate glass. Examples of good ion ($H_3^+$) conductors are $HUO_2PO_4.4H_2O$ and oxonium $\beta$-alumina. Examples of good $H^-$-ion conductors are $CaCl_2/CaH_2$, $Ba_2NH$ and $SrLiH_3$. An example of a solid organic electrolyte is poly(2-acrylamido-2-methyl-propanesulphonic acid).

Various transparent materials can be used for the counter or second electrode. Examples are hydrogenated oxidic materials such as $TiO_2$, $WO_3$, $NiO_2$, $Rh_2O_3$ and $V_2O_5$. Said materials can be loaded with hydrogen, by sputtering in a hydrogen atmosphere, or electrochemically in a separate step. Also thin layers of hydride-forming intermetallic $AB_2$ and $AB_5$ compounds, such as $TiNi_2$ and $LaNi_5$, can be used. Another possibility is the use of the same material as that used for the switching film, which results in the formation of a symmetrical switching device. Said materials are provided in the form of a layer with a thickness comparable to that of the switching film. The thickness is chosen in such a way that the hydrogen capacity in the second electrode is sufficient to convert the switching film from the mirror-like state to the transparent state, and vice versa.

Substrates onto which the layers of the switching device may be provided are transparent materials, such as glass, quartz, diamond, aluminium oxide or (flexible) synthetic resin. The substrate may be plane or curved.

The switching film is applied as a thin layer onto the substrate by means of conventional methods such as vacuum evaporation, sputtering, laser ablation, chemical vapor deposition or electroplating. In this respect, it is important that during and after application of the switching layer, the metal of the switching film is not subject to oxidation. In a vacuum-evaporation process, this is achieved by maintaining the pressure, in particular, of the residual gases water and oxygen, at a low level below $10^{-6}$ to $10^{-7}$ mbar. By subjecting the trivalent metal and magnesium to hydrogen at a pressure of $10^{-2}$ mbar, the metals in the switching film can be converted to the hydride state with a low hydrogen content, which film has a mirror-like appearance and is non-transparent.

The catalytically active layer, for example, of Pd, and the layer of the second electrode, can likewise be applied by means of one of the above-mentioned methods.

The inorganic solid-state electrolyte can also be applied as a thin layer by one of the above-mentioned methods. Inorganic oxidic electrolytes may also be manufactured by a sol-gel process, starting from a suitable alkoxy compound. Organic electrolytes may be applied e.g. by spin coating.

As thin films of metal hydrides have a sufficient electrical conductance, a thin transparent layer of indium-tin oxide (ITO) between the substrate and the switching layer, which is usual in conventional electrochromic devices, may be omitted. In this way, the switching device according to the invention is simpler than a conventional electrochromic display.

An example of a possible layer sequence in an electrochemical optical switching device according to the invention is:

substrate|ScMgH$_x$|Pd|KOH|TiOOH$_y$|ITO

In this configuration, ScMgH$_x$ is initially in the low-hydrogen, mirror-like state, whereas the tungsten oxide is loaded with hydrogen: TiOOH$_y$. The TiOOH$_y$ layer, which serves as the second electrode, is transparent. When a negative potential is applied to the ScMgH$_x$ film, $OH^-$ ions and H₂O are transferred through the electrolyte, and H$_2$O is reduced at the ScMg$_x$ film. By this electrochemical reaction ScMgHx is converted to ScMgH$_{x+\delta}$, which is transparent and neutral grey, whereas TiOOH$_{y-\delta}$ remains transparent: the device has become transparent in this state, or is switched from the mirror-like state to the transparent state, provided the Pd layer is transparent. The switching process is reversible. When a positive potential is applied to the ScMgH$_{x+\delta}$ film, this film loses hydrogen and the device becomes mirror-like and non-transparent again. This switching process can be repeated many times and takes place at a low voltage below 10 V.

Another example of a possible layer sequence is the following layer sequence of a solid state device in which zirconium oxide is used as a proton conductor:

substrate|ScMgHw|Pd|ZrO(x+2)Hy|WO3Hz|ITO

By virtue of switching from a mirror-like, non-transparent state to a transparent state, optionally via an absorbing black state, and conversely, the switching device in accordance with the invention can be used in many applications. By virtue of this optical effect, the switching device can be used as an optical switching element, for example as a variable beam splitter, optical shutter, and for controlling the illuminance or the shape of light beams in luminaires. Dependent upon the film thickness of the switching film, this film can exhibit almost zero transmission in the mirror-like state. This enables a switching device having a great contrast to be manufactured. The switching device can also be used for data storage and in optical computing, and in applications such as architectural glass, vision control glass, sun roofs and rear-view mirrors. In the mirror-like state not only visible light is reflected, but also radiant heat or infrared light, so that such a switching device can also be used for climate control.

The switching device in accordance with the invention can also be used as a variable transmission filter on or in front of a display screen to improve the contrast of the picture.

By making a pattern in the metal-hydride layer, a thin display can be manufactured. The construction of such a display is much simpler than that of an LCD (liquid crystal display) due to the absence of an LC layer, orientation layer, retardation layer and polarization filter. By using three different trivalent metals, a three-color dot pattern can be obtained.

These and other aspects of the invention will be apparent from and elucidated with reference to the embodiments described hereinafter.

Figure 2:
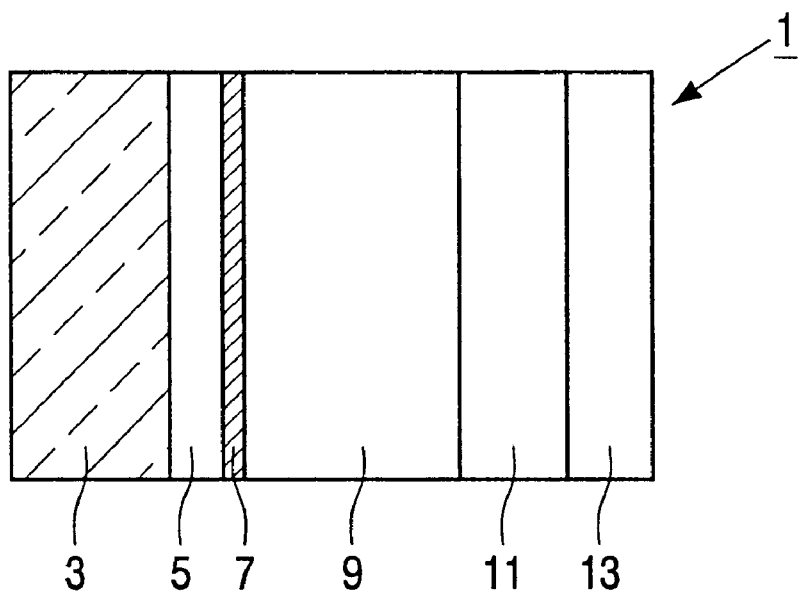

In the drawings:

FIG. 1 is a schematic cross-sectional view of an optical switching device in accordance with the invention, and FIG. 2 shows an electro-optical solid-state device according to the invention.

EXEMPLARY EMBODIMENT 1

FIG. 1 is a schematic, cross-sectional view of a switching device 1 in accordance with the invention. The layer thicknesses are not drawn to scale. A switching film 5 in the form of a 200 nm thick film of a ScMg-alloy containing 35 at. % Sc and 65 at. % Mg (Sc$_{0.35}$Mg$_{0.65}$) is provided on a polished, quartz substrate 3 by means of electron-beam evaporation. The residual pressure in the evaporation apparatus is less than 10−7 mbar. The deposition rate is 1.0 nm/s. In the same apparatus, a 10 nm thick palladium layer 7 is evaporated onto the switching film 5 by means of resistance heating at a deposition rate of 0.2 nm/s. Said switching film 5 has a metallic appearance and is non-transparent.

EXEMPLARY EMBODIMENT 2

FIG. 2 schematically shows a cross-section of a solid-state electro-optical switching device 1 according to the invention. The layer thicknesses are not drawn to scale.

The device comprises a glass plate 3, a first electrode 5 of Sc$_{0.3}$Mg$_{0.7}$H$_x$ as a switching film with a thickness of 200 nm, a palladium layer 7 with a thickness of 5 nm, a 50 μm thick layer 9 of an ion-conducting electrolyte containing KOH, a second electrode 11 of transparent TiOOH with a thickness of 350 nm, and an electroconductive ITO layer 13. All layers are transparent, except film 5 in the mirror-like low-hydrogen state, so that in this state the device 1 acts as a mirror.

The device can operate at room temperature. Layers 5 and 13 are connected to an external current source. By applying a cathodic DC current to the first electrode 5, the low-hydrogen, mirror-like composition is converted to a high-hydrogen composition, which is transparent and neutral grey. TiOOH of the second electrode 11 is converted into TiO$_2$, which is also transparent. The device 1 now acts as a transparent window. When reversing the current, the first electrode 5 returns to the low-hydrogen state which is mirror-like and non-transparent, and the second TiO$_2$ electrode 11 is converted to TiOOH. The device 1 has been switched to a mirror. The switching time is comparable to that of conventional electrochromic devices.

What is claimed is:

1. An optical switching device comprising a substrate and a switching film which comprises a hydride of a trivalent metal and magnesium, which hydrides can be reversibly switched from a low-hydrogen, mirror-like composition to a high-hydrogen, transparent composition by an exchange of hydrogen, characterized in that the trivalent metal comprises scandium.

2. A device as claimed in claim 1, characterized in that the switching film comprises 5 to 95 at. % magnesium with respect to the total metal content.

3. A device according to claim 1, characterized in that the switching film comprises 1–50 at. % scandium and 50–99 at. % magnesium.

4. A device according to claim 1, characterized in that the switching film comprises 15–40 at. % scandium and 60–85 at. % magnesium.

5. A device according to claim 1, characterized in that the switching film comprises 35 at. % scandium and 65 at. % magnesium.

6. A device according to claim 1, characterized in that the scandium-magnesium switching film additionally comprises another trivalent metal.

7. A device as claimed in claim 1, characterized in that the scandium-magnesium switching film additionally comprises an element selected from the group of nickel, aluminum, chromium, silicon, iron, cobalt, silver, zirconium, niobium, tantalum and hafnium.

8. A device as claimed in claim 1, characterized in that the switching film is provided with a catalytically active layer comprising at least one metal selected from the group consisting of palladium, platinum, cobalt and nickel.

9. A device as claimed in claim 8, characterized in that the catalytically active layer comprises a layer of Ag(x)Pd(1−x), where x is about 0.

10. A device as claimed in claim 1, characterized in that the switching film is provided with a catalytically active layer comprising at least one metal selected from the group of palladium and platinum.

11. A device as claimed in claim 1, characterized in that a protective layer is placed between the catalytically active layer and the switching film.

12. A device as claimed in claim 11, characterized in that the protective layer comprises a NiZr or a ZrOH compound.

13. A device as claimed in claim 12, characterized in that the thickness of the protective layer is 10 to 100 nm.

14. A device as claimed in claim 11, characterized in that the thickness of the protective layer is 10 to 100 nm.

15. A device as claimed in claim 1, characterized in that the switching film has a thickness in the range from 20 to 1,000 nm.

16. A device as claimed in claim 1, characterized in that the switching film comprises a hydride of an alloy of the trivalent metal and magnesium, or a multilayer of these elements.

17. A device as claimed in claim 1, characterized in that the hydrides can be reversibly switched via an intermediate opaque composition.

18. Switching film comprising a hydride of a trivalent metal and magnesium, which hydrides can be reversibly switched from a low-hydrogen, mirror-like composition to a high-hydrogen, transparent composition by an exchange of hydrogen, wherein the trivalent metal comprises scandium.

* * * * *